United States Patent [19]
Bolen

[11] Patent Number: 5,490,793
[45] Date of Patent: Feb. 13, 1996

[54] AUTOMOBILE CLOCKSPRING WITH VIBRATION DAMPENER

[75] Inventor: Patrick A. Bolen, Carthage, Ill.

[73] Assignee: Methode Electronics, Inc., Chicago, Ill.

[21] Appl. No.: 285,072

[22] Filed: Aug. 3, 1994

Related U.S. Application Data

[63] Continuation-in-part of Ser. No. 209,967, Mar. 11, 1994.

[51] Int. Cl.$^6$ ................................................... H01R 35/04
[52] U.S. Cl. ............................................ 439/164; 439/15
[58] Field of Search ........................................ 439/15, 164

[56] References Cited

U.S. PATENT DOCUMENTS

| | | | |
|---|---|---|---|
| 4,925,122 | 5/1990 | Bannai | 439/15 |
| 5,066,239 | 11/1991 | Bannai et al. | 439/164 |

FOREIGN PATENT DOCUMENTS 541088  6/1993  Japan .

Primary Examiner—Gary F. Paumen
Attorney, Agent, or Firm—David L. Newman

[57] ABSTRACT

A clockspring interconnector comprising a housing wall defining a chamber extending therethrough and a rotor hub attached to the housing. A coiled flat cable carried within the chamber surrounding the rotor hub. The flat cable having a first end attached to a first connector location of the rotor hub and a second end attached to a second connector location of the housing wall. A vibration dampener compresses the coils of the flat cable to limit vibration. An outer vibration dampener adjacent to the housing wall compresses the flat cable inward toward the rotor hub. An inner vibration dampener compresses the flat cable outwardly towards the housing wall. The vibration dampeners are preformed having folds formed therein. An alternate embodiment includes a pair of vibration dampeners pivotally attached to the clockspring housing which provide multi-directional compression to the flat cable.

8 Claims, 3 Drawing Sheets 5,490,793

AUTOMOBILE CLOCKSPRING WITH VIBRATION DAMPENER

This application is a continuation-in-part application of U.S. Ser. No. 08/209,967, filed Mar. 11, 1994.

BACKGROUND OF THE INVENTION

This invention pertains to a clockspring interconnector for enclosing an electrical conductor cable, the clockspring interconnector electrically connecting a rotatable electric device with a stationary electric device.

An increasing number of automobiles have air bag crash systems. An air bag is typically located on the steering wheel facing the driver. The air bag must be in continuous electrical connection with sensors in the car body. The sensors provide an electrical signal to the air bag crash assembly which instantly inflates the air bag in the event of a crash.

Accordingly, there is a need for an electrical connection between the rotatable portion of the air bag assembly which is mounted to the steering wheel, and the remaining portion of the assembly, which is in a stationary position in the car body. Electrical connections between rotatable and stationary parts are well known. Typically, an electrical brush rests upon a conductive ring, with one of the parts being rotatable to provide such rotatable electrical connection. However, there is a risk, particularly during the impact of an accident, of a transient failure of electrical connection with a brush and ring system, which would result in failure of the entire air bag system crash assembly.

Accordingly, a clockspring interconnector has been previously developed, comprising an outer housing, a rotor member and multiple intermediate housing members for enclosing and connecting the members; the housing and rotor member rotatably associated with one another at a plurality of bearing surfaces. A "clockspring" is located inside the interconnector. The clockspring is a flat conductor cable and has two ends conductively attached to conductor wires which pass out of the interconnector to unite the air bag to the sensing device. The interconnector is mounted on the steering column, and the steering wheel may be rotated in either direction while a continuous, positive electrical connection is provided between air bag sensors via the clockspring interconnector.

While prior art clockspring interconnectors are effective to provide the necessary continuous electrical connection between an air bag or other device on a rotating column and a stationary portion of a circuit, the prior art systems do not provide for proper reduction of noise which occurs due to vibration of the flat cable within the clockspring housing. It is known in the prior art to include insulation materials within a clockspring housing in order to deaden the sound created by the scraping of the flat cable during rotation of the clockspring. However, there is additional noise created while the clockspring is stationary due to vibrations caused by the movement of the automobile. The vertical vibration of a steering column causes the flat cable of a clockspring to vibrate and rattle against the adjacent coils of the flat cable. Accordingly, there is desired a clockspring which includes a vibration dampener to avoid the above disadvantages.

It has been disclosed in U.S. Pat. No. 4,925,122 to have presser members which are secured to the wails of the housing of a clockspring and provide pressure against the flat cable. This invention is disadvantageous in that the presser members are complicated to install within a clockspring and are expensive to manufacture. The presser members also provide only minimal points of contact to compress the flat cable. Thus, there is needed a vibration dampener which is quickly and easily installed and is inexpensive to manufacture. Also, a vibration dampener which provides multiple points of contact to a flat cable for compression would be advantageous.

It is an object of the present invention to provide a clockspring assembly including a vibration dampener to greatly reduce the vibration of the flat cable of a clockspring.

It is another object of the present invention to provide a clockspring assembly, including a sound dampener which is easily incorporated into a clockspring assembly and is inexpensive to manufacture.

SUMMARY OF THE INVENTION

The above objects and advantages are provided by a clockspring interconnector comprising a housing defining a chamber extending therethrough and a rotor cover attached to the housing. A coiled flat cable carried within the chamber surrounding the rotor cover. The flat cable having a first end attached to a first connector location of the rotor cover and a second end attached to a second connector location of the housing.

The chamber includes a vibration dampener preformed to expand upon unwinding of the flat cable and to compress upon winding of the flat cable. An outer vibration dampener having preformed bends is located between the flat cable and an exterior housing wall. An inner vibration dampener having preformed bends is located between the flat cable and an internal rotor hub. The inner vibration dampener is attached to the inner rotor hub.

An alternative embodiment of the present invention comprises a vibration dampener pivotally mounted to the housing. The vibration dampener includes a first arm and second arm which provide inward compression of a flat conductor cable in a single lateral direction and also inwardly toward the rotor hub. The first arm and second arm are joined at a base portion which is mounted to the housing via a post. The first arm contacts the flat conductor cable at a first compression point and the second arm contacts the flat conductor cable at a second compression point. The vibration dampeners are compressible from an unwound orientation of the clockspring to a wound position of the clockspring. The vibration dampener may be formed of either mylar, a metallic material or a metallic material covered in a polymer material.

These and other features of the invention are set forth below in the following detailed description of the presently preferred embodiments.

DETAILED DESCRIPTION OF THE PRESENTLY PREFERRED EMBODIMENTS

Figure 1:
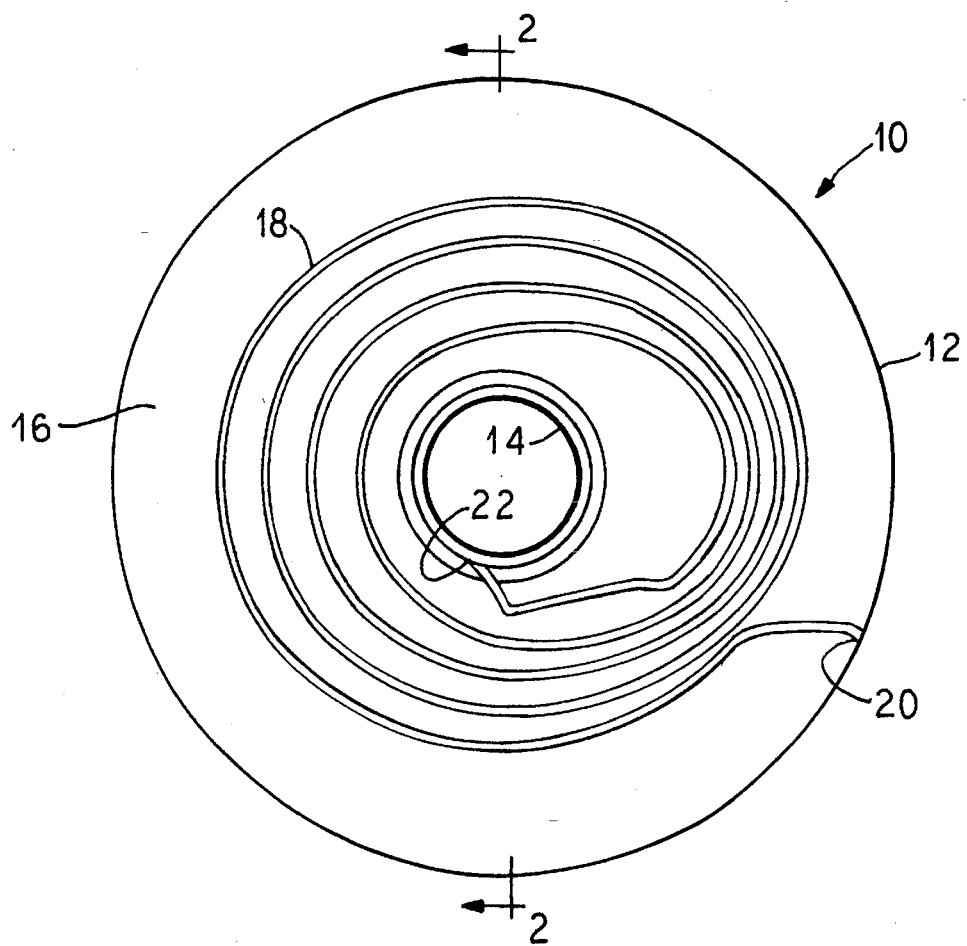
FIG. 1 is a top view of a prior art clockspring.

The clockspring interconnector of this invention is better understood by reference to FIGS. 1–4. FIG. 1 shows a clockspring 10 having a housing wall 12 and a rotor hub 14.

The housing 12 generally has a cover which has been removed from this drawing so that the inside of the clockspring 10 may be viewed. A chamber 16 is defined between the housing wall 12 and the rotor wall 14. A flat conductor cable 18 is wound within the chamber 16. The flat cable 18 is connected to the nonmovable housing 12 at point 20 and at the opposite end of the flat cable 18 it is connected to the movable rotor 14 at point 22. When the clockspring 10 is assembled with a steering assembly the housing 12 is stationary and attached to the steering column while the rotor hub 14 is attached to and rotates with the steering wheel.

It can be seen that the flat cable 18 is loosely wound within the chamber 16. This figure depicts the clockspring in its centered position. The clockspring may be turned clockwise which will wind flat cable tighter. The clockspring 20 may also be turned counter-clockwise which will unwind the flat cable and make it even looser. It can be seen that there are no objects within the chamber 16 to obstruct the movement of the flat cable 18. Upon installation on a steering column in an automobile, vibrations occur which cause the flat cable to vibrate against the housing 12 and also against the adjacent flat cable coils. This vibration causes noise which is unsatisfactory. The prior art clocksprings in their centered position and their unwound position allow for the flat cable to be loosely wound which causes vibration and unacceptable noise levels.

Figure 2:
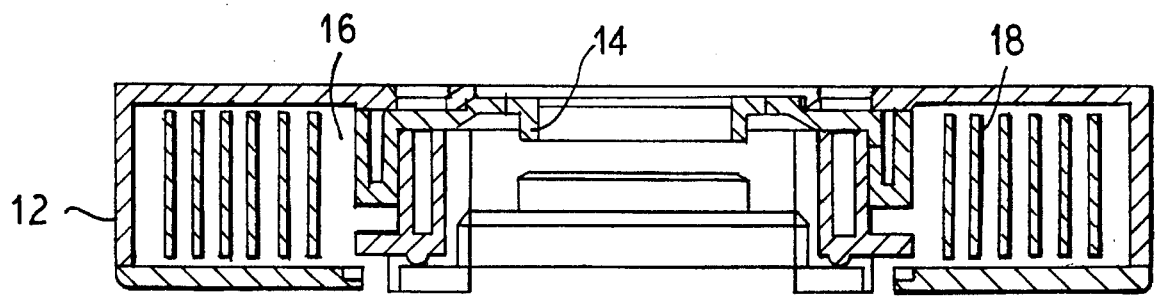
FIG. 2 is a side elevation view of a prior art clockspring.

FIG. 2 is a side elevation view of FIG. 1 taken at line 2—2. This view shows the housing 12 and rotor 14 defining chamber 16 in which the flat cable 18 is shown. It can be seen that the flat cable is loosely wound having space between the coils. This loosely wound flat cable 18 vibrates uninhibited and provides unsatisfactory noise levels when the clockspring is installed on a steering column.

Figure 3:
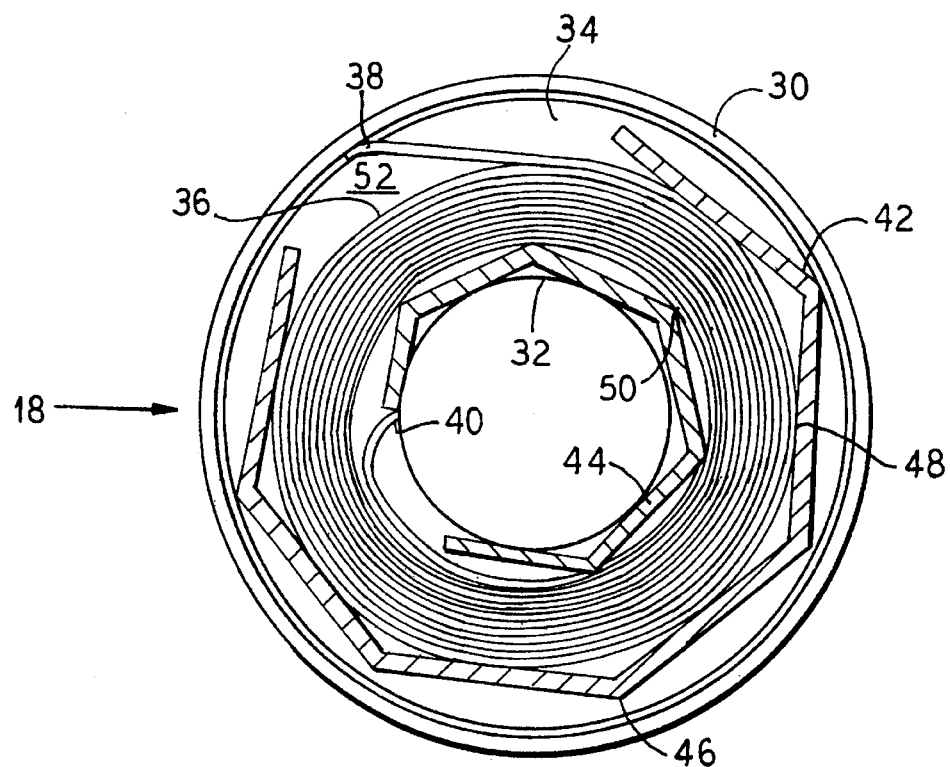
FIG. 3 is a top view of a clockspring.

FIG. 3 shows a preferred embodiment of the present invention having a clockspring housing 30 and rotor hub 32 defining chamber 34. Within the chamber 34 is flat conductor cable 36. The flat cable 36 is attached to the housing 30 at point 38 and its opposite end attached to the rotor hub 32 at point 40. Vibration dampeners 42,44 are provided to compress the flat cable 36 in order to limit vibration. In a preferred embodiment, inner vibration dampener 44 is inserted around the rotor hub 32 and outer vibration dampener 42 is inserted against the housing wall 30. The vibration dampener 42,44 may be constructed of an elastic polyester material and preformed to include folds 46. In a preferred embodiment, the outer vibration dampener 42 is mylar and has five folds 46. The inner vibration dampener 44 may be made of a similar polyester material with preformed folds. The inner vibration dampener 44 may be attached to the rotor hub 32 at point 40. The attachment may occur by any means and may be attached similar to the attachment means of the flat cable 36 at point 40.

The vibration dampener 42,44 provides for the dampening of the vibrations caused by the flat cable 36 by compressing the flat cable together. FIG. 3 depicts a clockspring 18 in the centered position similar to the clockspring 10 shown in FIG. 1. The clockspring 18 may be wound clockwise which will cause the flat cable 36 to wind tighter; or the clockspring 18 may be turned in a counter-clockwise direction which will cause the flat cable 36 to unwind and loosen. It can be seen that the flat cable 36 of clockspring 18 shown in FIG. 3 is compressed so that the spacing between the coils of the flat cable 36 is small. This is unlike the clockspring 10 depicted in FIGS. 1 and 2 in which the clockspring was also in the centered position but the flat cable 18 was loose. The use of the vibration dampeners 42,44 having preformed folds 46 cause the vibration dampeners 42,44 to abut against the flat cable 36.

The outer vibration dampener 42 by maintaining its folds 46 causes abutment points 48 midway between the folds to make contact with the flat cable 36 and compress it inwardly toward the rotor hub 32. The inner vibration dampener 44 maintains its folded shape and causes fold points 50 to abut against the flat cable 36 and push the flat cable outwardly toward the housing wall 30. The joint action of the inner vibration dampener 50 pushing outward and the outer vibration dampener 42 pushing inward, forces the coils of the flat cable 36 to be closely spaced which reduces the amount of vibration between the coils of the flat cable 36 and against the housing 30.

Figure 4:
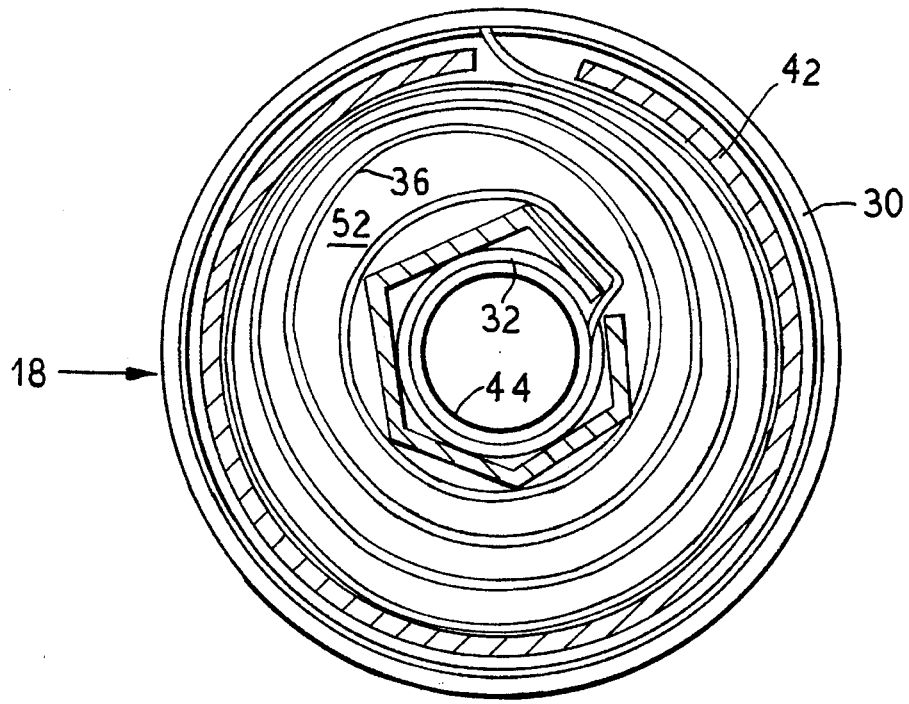
FIG. 4 is a top view of the clockspring of FIG. 3 in an alternative orientation.

FIG. 4 shows the clockspring 18 in a totally unwound position wherein the clockspring has been turned counter-clockwise from its position in FIG. 3. This depiction shows that upon rotation of the clockspring in a counter-clockwise direction, the flat cable 36 unwinds and pushes outwardly. The outer vibration dampener 42 is of a flexible material which allows it to expand outwardly with the flat cable 36. Thus, the vibration dampeners 42,44 do not inhibit the movement of the flat cable 36 upon rotation of the clockspring 88. As the clockspring 18 is turned back, clockwise to its centered position, the outer vibration dampener 42 will retain its folded position as shown in FIG. 3.

In a preferred embodiment, both the inner vibration dampener 44 and the outer vibration dampener 42 are used, within the clockspring 18. However, this invention also anticipates that only the outer vibration dampener 42 may be used or that only the inner vibration dampener 44 may be used to provide a reduction of the noise level caused from the vibration of the flat cable 36. The vibration dampeners 42,44 of this invention may also be used in combination with an insulation layer 52 attached to the top and bottom inner surfaces of clockspring 18. The vibration dampeners 42,44 may be easily assembled within the housing 30 of the clockspring 18. Following attachment of the flat cable 36 to the housing 30 at point 38 and the rotor hub 32 at point 40, the vibration dampeners 42,44 may simply be inserted next to the flat cable 36. Upon complete assembly of the clockspring by putting a cover over the housing 30, the vibration dampeners 42,44 will be secured within the chamber 34 of the clockspring 18.

Figure 5:
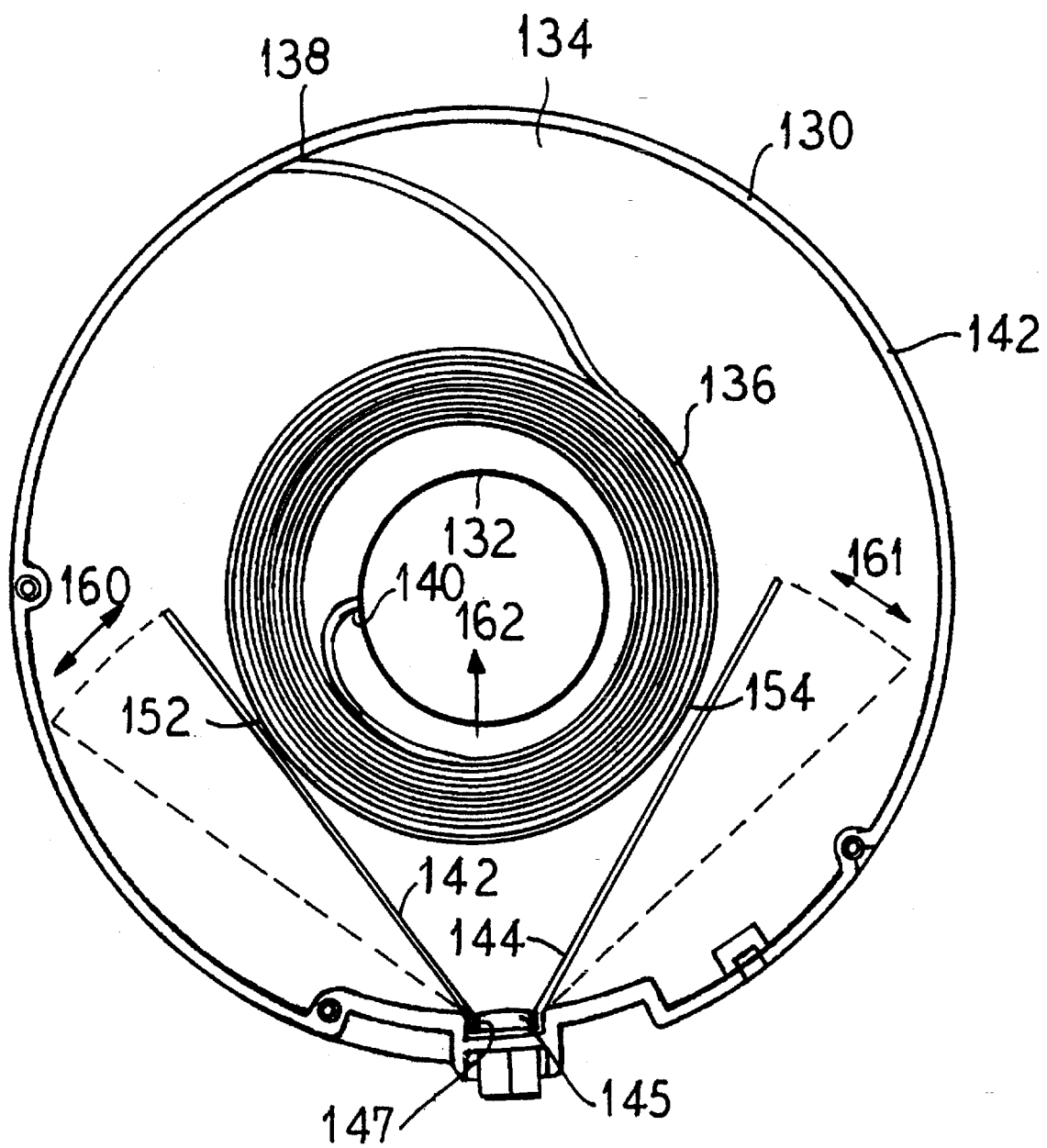
FIG. 5 is a top view of a further embodiment of a clockspring.

FIG. 5 discloses an alternative embodiment of the present invention having a clockspring housing 130 and rotor hub 132 defining a chamber 134. Within the chamber 134 is flat conductor cable 136. The flat cable 136 is attached to the housing 130 at point 138 and its opposite end attached to the rotor hub 132 at point 140. A pair of vibration dampeners 142,144 are provided to compress the flat cable 136 in order to limit vibration. The vibration dampener 142,144 may be constructed of an elastic polyester material or even a metallic material. In an alternative embodiment, the vibration dampener 142,144 could also be constructed of a metallic material covered with a plastic or polymer coating. In a preferred embodiment, the vibration dampeners 142,144 are a unitary member which includes a common base portion 145 which are secured to the housing 130 via posts 147.

The vibration dampeners 142,144 are shown in FIG. 5 in a deflected state where the clockspring is in a totally wound position and the flat cable 136 is wound tightly around hub 132. As the clockspring is rotated and the flat cable 136 unwinds, it expands and causes the vibration dampeners 142,144 to flex outwardly in direction of arrows 160,161. During any unwinding and winding of the flat cable 136, the vibration dampeners 142,144 apply pressure to the conductor cable 136 at a first compression point 152 and a second compression point 154. The vibration dampeners 142,144 apply an inward force against the conductor cable 136 toward the hub 132 and simultaneously apply a force laterally in direction of arrow 162. The exertion of multi-directional force against the conductor cable 136 by the vibration dampeners 142,144, ensures that the flat cable 136 remains in a condensed form and is centered in the clockspring, reducing any excess movement, vibration and noise. In this preferred embodiment the vibration dampener includes a first arm 142 and a second arm 144, each arm attached to the clockspring housing 130 and being pivotally mounted thereto.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A clockspring interconnector comprising:

a housing having a housing wall;

said housing wall defining a chamber;

a rotor hub attached to said housing;

a flat conductor cable coiled within said chamber having a first end and second end;

said first end attached to said rotor hub;

said second end attached to said housing; and a vibration dampener attached to said housing and compressing said flat conductor cable including a first arm and second arm which provide inward compression of the flat conductor cable in a single, lateral direction and also inwardly toward said rotor hub, said first arm and said second arm joined at a base portion which is mounted to said housing via a post.

2. The clockspring interconnector of claim 1 wherein said vibration dampener is pivotally mounted to said housing.

3. The clockspring interconnector of claim 1 wherein said first arm contacts the flat conductor cable at a first compression point and said second arm contacts said flat conductor cable at a second compression point.

4. The clockspring interconnector of claim 1 wherein said vibration dampeners are deflectable from an unwound orientation of the clockspring to a wound position of the clockspring.

5. A clockspring interconnector comprising:

a vibration dampener pivotally mounted to said housing;

said vibration dampener includes a first arm and second arm which provide inward compression of the flat conductor cable in a single, lateral direction and also inwardly toward said rotor hub;

said first arm and said second arm are joined at a base portion which is mounted to said housing via a post;

said first arm contacts the flat conductor cable at a first compression point and said second arm contacts said flat conductor cable at a second compression point; and said vibration dampeners are deflectable from an unwound orientation of the clockspring to a wound position of the clockspring.

6. The clockspring interconnector of claim 5 wherein said vibration dampener is formed of mylar.

7. The clockspring interconnector of claim 5 wherein said vibration dampener is formed of a metallic material.

8. The clockspring interconnector of claim 5 wherein said vibration dampener is formed of a metallic material covered in a polymer material.

* * * * *